No. 712,901. Patented Nov. 4, 1902.
W. L. BLACK.
ANTIFRICTION DEVICE FOR SUCKER RODS AND COUPLINGS.
(Application filed Nov. 7, 1901.)
(No Model.) 2 Sheets—Sheet 1.
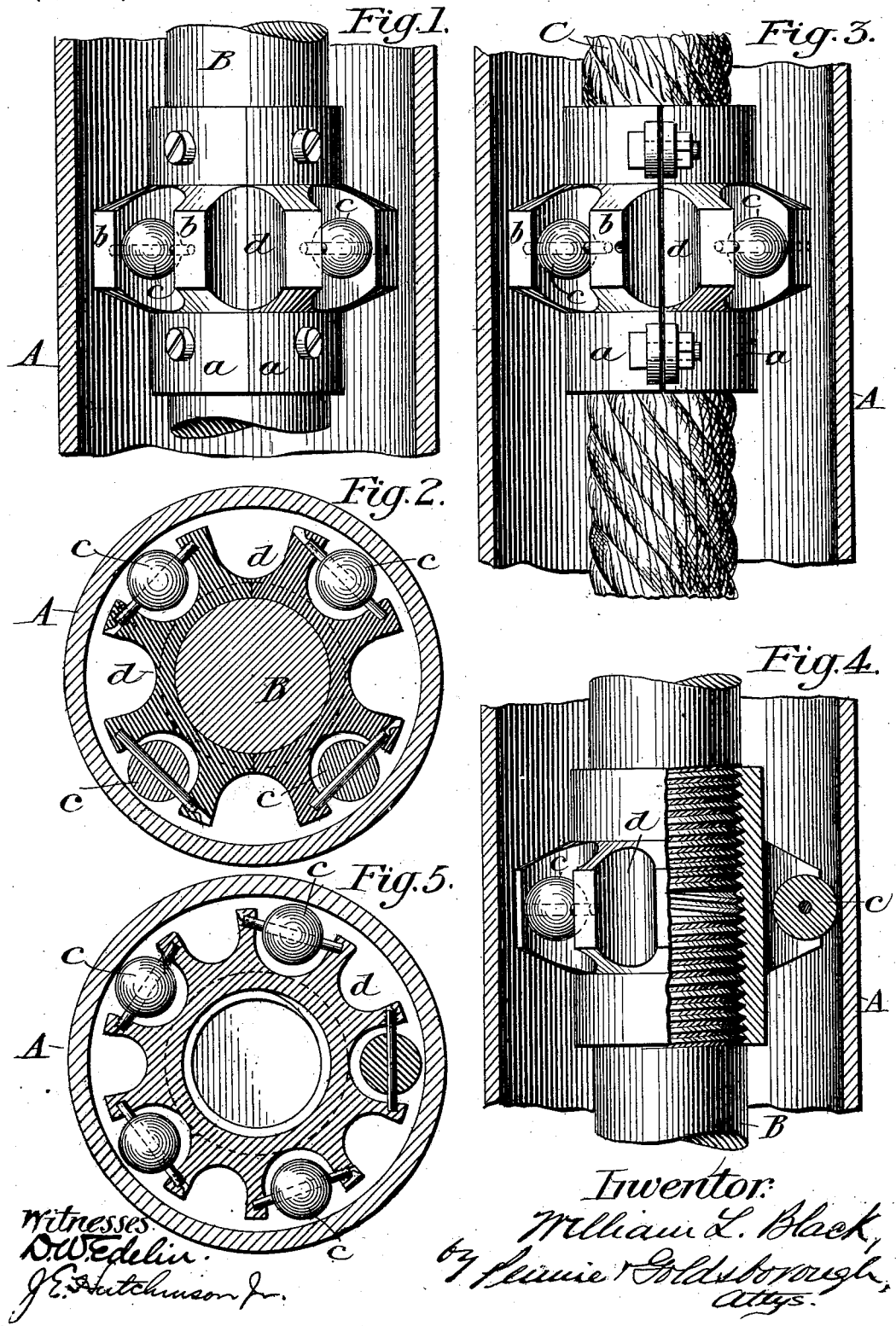
Witnesses
D. W. Edelin
J. E. Hutchinson Jr.
Inventor:
William L. Black,
by Leinie & Goldsborough,
Attys.

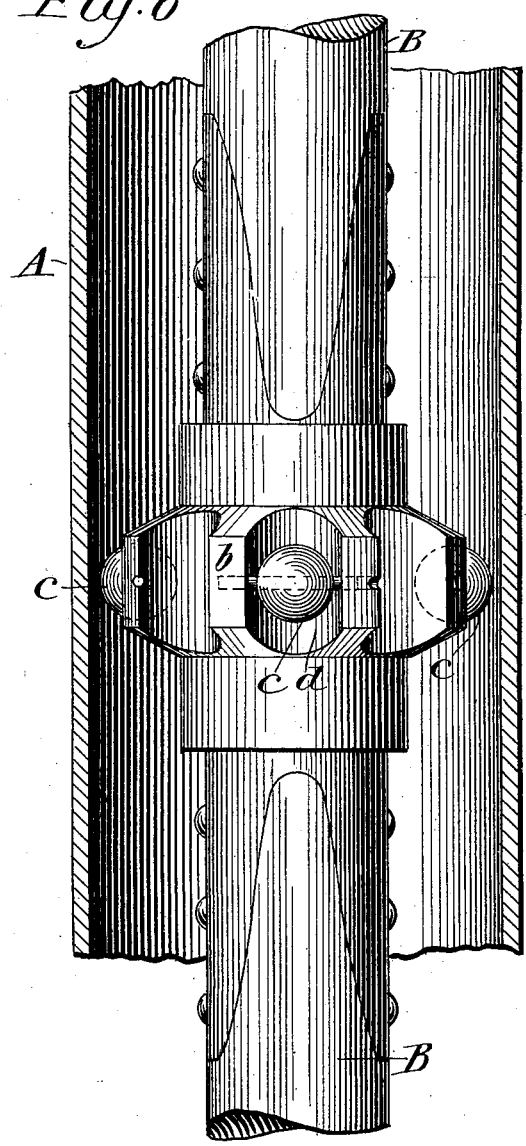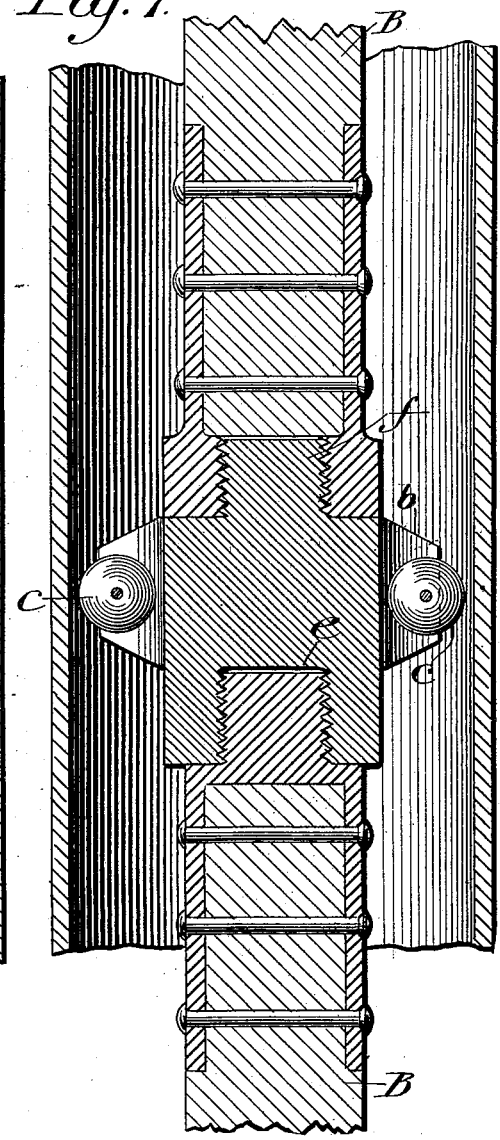

UNITED STATES PATENT OFFICE.

WILLIAM L. BLACK, OF FORT McKAVETT, TEXAS.

ANTIFRICTION DEVICE FOR SUCKER-RODS AND COUPLINGS.

SPECIFICATION forming part of Letters Patent No. 712,901, dated November 4, 1902.

Application filed November 7, 1901. Serial No. 81,433. (No model.)

*To all whom it may concern:*

Be it known that I, WILLIAM L. BLACK, a citizen of the United States, residing at Fort McKavett, county of Menard, and State of Texas, have invented certain new and useful Improvements in Antifriction Devices for Sucker-Rods and Couplers; and I do hereby declare the following to be a full, clear, and exact description of the invention, such as will enable others skilled in the art to which it appertains to make and use the same.

My invention relates to antifriction devices for sucker rods or ropes or for the couplers thereof, and is particularly designed to subserve the function of protecting the rod, rope, or coupler from wear, while at the same time opposing the minimum amount of resistance to liquid flow and avoiding the accumulation of sand and grit in and about the antifriction-balls and the bearings thereof, whereby the durability, and consequently the efficiency, of the device is proportionately enhanced.

In the accompanying drawings, Figure 1 represents in vertical section a sucker-rod, together with the inclosing tube therefor, said sucker-rod being provided with one of my improved devices. Fig. 2 represents a horizontal section on the line 2 2 of Fig. 1. Fig. 3 represents an elevation of said device, shown in this instance as attached to a rope and within the inclosing tube, as before. Fig. 4 represents in vertical section the device as applied to a sucker-rod coupler, and Fig. 5 represents a horizontal section on the line 5 5 of Fig. 4. Fig. 6 illustrates in elevation a modified form of coupler embodying my invention, the inclosing tube being shown in section. Fig. 7 represents said modified form of coupler in section, the inclosing tube being also shown in section.

Similar letters of reference indicate similar parts throughout the several views.

Referring to the drawings, A indicates the inclosing tube for the sucker rod B or rope C.

In those instances where a sucker rod or pipe is employed it is customary to construct it in lengths of about twenty feet, these lengths being connected by suitable couplers. It will be understood, therefore, that Figs. 4 and 5 represent the application of the invention to these coupler-joints, and it will also be understood that the antifriction devices at the coupler-joints may be supplemented by the employment of similar antifriction devices of the kind shown in Figs. 1, 2, and 3, which latter are designed to be clamped to the rod or pipe in any convenient number and at any suitable points along the length of the sucker rod or tube, or, if a rope is employed, in any desired number and at any suitable places along the length of said rope.

Referring particularly to the device shown in Figs. 1, 2, and 3, it will be noted that for ready attachment to the rod or tube the clamp is divided longitudinally into two halves $a$, rigidly but removably secured by any suitable means to the sucker rod or rope. The material of which these sections are made is preferably of some non-corrodible metal—as, for instance, galvanized iron—and the sections are provided with radially-projecting bearings $b$, within which are mounted the gudgeons or journal-pins of the antifriction-rollers $c$, which latter are also made either of non-corrodible metal or of glass. It will be noted that the spaces within which the antifriction balls or rollers $c$ are mounted are freely open at top and bottom, and for this reason it is impossible for any sand or grit to lodge in the said spaces and interfere with the rotation of the balls or cause abrasion. For convenience in inserting the balls or rollers and holding them in place I prefer to have each ball mounted to revolve upon its journal-pin and to bore a hole, as indicated, for the reception of the journal-pin, the journal-pin when driven in making a sufficiently-tight fit to prevent it from working outward. If, as sometimes contemplated by me, the clamp-sections be made of malleable iron, the outer end of the journal-pin may be slightly burred or barbed, as indicated in Fig. 2, so as to assist in holding the pin in place, and in this instance the metal at the end of the hole bored for the reception of the pin will be slightly upset or depressed by the blow of a hammer, so as to further insure against longitudinal movement after the pin is driven into place. It will furthermore be observed that the clamp is provided with open spaces $d$ between each two adjacent balls or rollers.

This feature of the device is designed to permit the ready flow of the fluid of the well, whatever it may be, to pass the clamp.

In the adaptation of the invention to a coupler, as illustrated in Figs. 4 and 5, the antifriction balls or rollers are similarly mounted upon similar journal-pins secured in the same manner within the radial projections supporting them. So, also, the same intermediate spaces are employed between adjacent balls, and the balls themselves are located in spaces freely open at the top and bottom, so as to be protected against the accumulation of grit or sand. In fact, the same features of invention throughout are present in the device shown in Figs. 4 and 5, and the construction is identical, save that in Figs. 4 and 5 the antifriction devices are upon a coupler-sleeve screw-threaded internally, so as to connect adjacent sucker-rod or sucker-tube sections. It will furthermore be noted that in both instances the external diameter of the antifriction device as a whole is slightly less than the internal diameter of the inclosing tube A, so as to provide a corresponding ease and facility of movement.

It is not uncommon to construct sucker-rods of wood, the wooden sections being provided at their ends with metal coupling members, the coupling member of one section being internally screw-threaded, so as to connect with the externally-threaded projection or spigot of the coupling member of the next adjoining section. In Figs. 6 and 7 I have illustrated a coupler adapted for ready application to a sucker-rod of this general character. The coupler of Figs. 6 and 7 is itself provided with an internally-screw-threaded socket $e$ and with an externally-threaded spigot or projection $f$. In other respects it is identical with the coupler shown in Figs. 4 and 5. It will be evident that the ordinary wooden sucker-rods of the kind described may be provided with the coupler of Figs. 6 and 7 by merely unscrewing the sections of the wooden sucker-rods and inserting between them the sucker-rod coupling of Figs. 6 and 7. By means of this expedient, therefore, I am enabled to adapt the advantageous features of the invention to existing sucker-rods, so that well-owners may have the advantages of the invention without entirely dismantling and discarding the sucker-rods already in use.

In Figs. 1, 2, and 3 I have shown the device as provided with four antifriction balls or rollers, and in Figs. 4, 5, 6, and 7 I have shown it as provided with 5 antifriction balls or rollers. It will be evident that a greater or less number of balls may be employed according to the circumstances of the case, and particularly according to the diameter of the sucker rod or rope, the smaller size requiring a proportionately less number of antifriction balls or rollers.

Having thus described my invention, what I claim is—

1. Antifriction devices for sucker-rods and sucker-rod couplers, comprising antifriction balls or rollers, and radial bearings within which said balls or rollers are mounted, the spaces within which the balls or rollers rotate being freely open above, below and around said balls or rollers so as to prevent the accumulation of sand and grit therein; substantially as described.

2. Antifriction devices for sucker-rods and sucker-rod couplers, comprising antifriction balls or rollers and radial bearings within which said balls or rollers are mounted, the spaces within which the balls or rollers rotate being freely open above, below and around said balls or rollers, and adjacent balls being separated by intervening spaces likewise open above and below; substantially as described.

In testimony whereof I affix my signature in presence of two witnesses.

WILLIAM L. BLACK.

Witnesses:
JOHN C. PENNIE,
EDWIN S. CLARKSON.